(12) United States Patent
Deng et al.

(10) Patent No.: US 8,570,293 B2
(45) Date of Patent: Oct. 29, 2013

(54) NOISE REDUCTION METHOD AND SYSTEM FOR TOUCH DETECTION DEVICE

(75) Inventors: Gengchun Deng, Shenzhen (CN); Xiaoxiang Chen, Shenzhen (CN)

(73) Assignee: Shenzhen Huiding Technology Co., Ltd., Shenzhen (CN)

( * ) Notice: Subject to any disclaimer, the term of this patent is extended or adjusted under 35 U.S.C. 154(b) by 153 days.

(21) Appl. No.: 13/111,967

(22) Filed: May 20, 2011

(65) Prior Publication Data
US 2012/0249433 A1    Oct. 4, 2012

Related U.S. Application Data

(63) Continuation of application No. PCT/CN2011/073650, filed on May 4, 2011.

(30) Foreign Application Priority Data

Mar. 28, 2011  (CN) .......................... 2011 1 0075916

(51) Int. Cl.
*G06F 3/041* (2006.01)

(52) U.S. Cl.
USPC ........................................ 345/173; 178/18.01

(58) Field of Classification Search
USPC .................... 345/173–178; 178/18.01–18.07
See application file for complete search history.

(56) References Cited

U.S. PATENT DOCUMENTS

| | | | | |
|---|---|---|---|---|
| 5,648,642 A * | 7/1997 | Miller et al. | ............... | 178/18.06 |
| 6,075,520 A * | 6/2000 | Inoue et al. | .................... | 345/173 |
| 6,624,835 B2 * | 9/2003 | Willig | ........................... | 347/173 |
| 7,643,011 B2 * | 1/2010 | O'Connor et al. | ............ | 345/173 |
| 7,663,607 B2 * | 2/2010 | Hotelling et al. | ............. | 345/173 |
| 2002/0089491 A1 * | 7/2002 | Willig | ........................... | 345/173 |
| 2005/0189154 A1 * | 9/2005 | Perski et al. | ............... | 178/18.06 |
| 2007/0109274 A1 * | 5/2007 | Reynolds | ...................... | 345/173 |
| 2007/0165005 A1 * | 7/2007 | Lii et al. | ........................ | 345/173 |
| 2008/0087477 A1 * | 4/2008 | Cho et al. | ................... | 178/18.01 |
| 2008/0158147 A1 * | 7/2008 | Westerman et al. | .......... | 345/156 |
| 2008/0158185 A1 * | 7/2008 | Westerman | ..................... | 345/173 |
| 2009/0085894 A1 * | 4/2009 | Gandhi et al. | ................ | 345/175 |
| 2009/0189867 A1 * | 7/2009 | Krah et al. | .................... | 345/173 |
| 2009/0303198 A1 * | 12/2009 | Yilmaz et al. | ................. | 345/173 |
| 2009/0303203 A1 * | 12/2009 | Yilmaz et al. | ................. | 345/174 |
| 2010/0060609 A1 * | 3/2010 | Doi et al. | ....................... | 345/174 |
| 2010/0295810 A1 * | 11/2010 | Nagata et al. | ................. | 345/173 |
| 2011/0025634 A1 * | 2/2011 | Krah et al. | .................... | 345/173 |
| 2011/0134076 A1 * | 6/2011 | Kida et al. | .................... | 345/174 |
| 2012/0001857 A1 * | 1/2012 | Chang | ........................... | 345/173 |

\* cited by examiner

*Primary Examiner* — Amr Awad
*Assistant Examiner* — Roberto Flores

(57) ABSTRACT

Noise reduction method and system for a touch detection device are disclosed. The noise reduction method includes: step A, performing a synchronous sampling on the touch detection nodes in one same group and storing the sampling data; step B, comparing each sampling data against a corresponding reference data to calculate a differential data which, as a detection data, replaces a corresponding original sampling data; step C, calculating statistics of the replacing detection data to screen out valid data to calculate a DC offset component indicative of a noise ingredient; and step D, obtaining noise-filtered detection data by subtracting the DC offset component from each detection data.

3 Claims, 8 Drawing Sheets

NOISE REDUCTION METHOD AND SYSTEM FOR TOUCH DETECTION DEVICE

CROSS REFERENCE TO RELATED APPLICATIONS

This application is a Continuation application of international application PCT/CN2011/073650, filed on May 4, 2011, which claims priority of Chinese patent application 201110075916.X, filed on Mar. 28, 2011. These two applications are incorporated herein by reference.

TECHNICAL FIELD

The present invention relates to touch detection technology and, more particularly, to a method and system for reducing noise in detection data in a touch detection device.

BACKGROUND

Touch detection devices may come in various forms, such as, in the form of a touch key, a touch pad, or a touch screen, and may be classified into various types including infrared (IR) type, resistive type, ultrasonic type, induction type, and capacitive type, in terms of touch detection manner As shown in FIG. 1, in one typical touch detection device, a touch controller is connected to a touch sensor to collect and process touch detection data of the touch sensor so as to determine a coordinate of a touch point.

Sampling for touch detection data is usually performed on the detection nodes on a touch sensor in a scanning manner. For example, for a capacitive multipoint touch screen, the detection nodes are a plurality of projected capacitor nodes arranged in a matrix over a surface of the touch screen. For a group of touch keys, the detection nodes are respective sensors positioned in correspondence with the touch keys. The touch controller can obtain a matrix of desired sampling data within each detecting and sampling period by obtaining the sampling data by groups or individually. FIG. 2 illustrates a sampling data matrix obtained in a touch detection device with M*N nodes in one sampling period. In practice, most touch detection devices satisfy the condition of N+M≥3 except for the situation where a single touch key is used. Due to limited hardware resources and processing capability of the touch controller, to obtain this M*N sampling data matrix, scanning operations usually need to be performed by groups to achieve a sufficient refresh rate. The nodes may be grouped such that each group includes one or more rows of nodes, one or more columns of nodes, or nodes within a respective preset area. A typical example of such group sampling is arranged row by row, which results in the detection data as follows:

the first row: $S_{11}, S_{12}, S_{13} \ldots S_{1j} \ldots S_{1n}$
the second row: $S_{21}, S_{22}, S_{23} \ldots S_{2j} \ldots S_{1n}$
the i-th row: $S_{i1}, S_{i2}, S_{i3} \ldots S_{ij} \ldots S_{in}$
the m-th row: $S_{m1}, S_{m2}, S_{m3} \ldots S_{mj} \ldots S_{mn}$ According to the basic principle of touch detection, by detecting and data sampling when no touch event occurs, the touch detection device obtains a reference data matrix shown in FIG. 3 and stores the reference data matrix in a memory. New sampling data is then compared against the reference data to calculate the difference between the new sampling data and the reference data, as shown in FIG. 4A and FIG. 4B.

$$D_{ij}=S_{ij}-R_{ij} \text{ (where } i=1, 2, \ldots m; j=1, 2, \ldots n)$$

Therefore, the sampling data sampled in each sampling period can be used to calculate a corresponding differential data matrix as the touch detection data for further processing, i.e. for determining whether a touch event occurred or calculating a coordinate or trajectory of a touch point. Exemplary calculating methods include threshold method, watershed method, center-of-gravity method, or the like. Whichever method is used, the detection data matrix is compared against a predetermined threshold value or threshold function to thereby determine whether a touch event occurred and whether the detected coordinate of the touch point is valid.

As can be seen from the above description, the reliability, stability and resolution of the touch detection results are dependent upon the precision and stability of the touch detection data. If the sampling value $S_{ij}$ includes a noise or error, this noise or error will be propagated to the differential value $D_{ij}$, such that later calculations will produce an imprecise result.

However, all touch detection devices are subject to interferences during practical use, regardless of the form and detection manner of the touch detection devices. In many cases, the interferences introduce a large error into the touch detection data, which may degrade the stability and resolution of the touch detection result, or even worse, cause the touch detection device to produce a detection result of false touch or touch failure.

Take the currently popular capacitive touch screen as an example, in order to diminish the influence of LCD module and other outside interference signals, touch sensors with a double-layered or three-layered structure are generally required. The conductive layer closest to a display acts to shield the interference signals.

FIG. 5 illustrates an exemplary structure which includes a display 11, a housing 12, a driving electrode layer 13, a glass plate 14, a sensing electrode layer 15, and an outer panel 16. In this structure the driving electrodes need to be boldly filled and closely arranged over the entire touch sensor's area. During each scan, one or more driving electrodes are driven while the remaining driving electrodes are connected to ground. In this case, the driving electrodes also shield the interference signals.

FIG. 6A and FIG. 6B illustrate another structure in which driving electrodes 13 and sensing electrodes 15 are alternately arranged on the same plane. In this case, the driving electrodes 13 cannot be closely arranged to cover the sensing electrodes 15 and therefore cannot shield the interference signals. As such, an extra conductive shielding layer 24 is required in this structure.

The above described structures have the following defects. Firstly, these structures increase the difficulties in fabricating the sensor, which may decrease product yield and increase cost. In addition, the thickness of the sensor is increased thus increasing the weight as well as reducing the light transmittance thereof. Furthermore, only interference signals from below the sensor, for example, from the LCD display, can be shielded in these structures, while other interference signals, for example, power ripple, radio frequency, cannot be prevented.

There is currently another method of diminishing the interferences in which an auxiliary reference electrode is added to the sensor. It is configured such that this auxiliary reference electrode is only influenced by interference signals but not influenced by a touch. As such, the touch controller can eliminate the influence of outside interferences in theory by additionally sampling the reference electrode. However, this method would result in a complicated structure of the touch sensor and more detection ports of the touch controller being occupied, which increases the cost of the system.

SUMMARY

Accordingly, the present invention is directed to a noise reduction method for a touch detection device which can reduce the influence of the external interference signals on the touch terminal's detection data without relying on the additional shielding layer on the sensor, thus reducing the hardware cost of the touch detection device.

In one embodiment of the noise reduction method for the touch detection device, all touch detection nodes of the touch detection device are divided into several groups (for example, with each group containing one row, one column, or several rows or columns of detection nodes), and a synchronous sampling is performed on the touch detection nodes in each group.

The noise reduction method includes:

step A, performing a synchronous sampling on the touch detection nodes in one same group and storing the sampling data;

step B, comparing each sampling data against a corresponding reference data to calculate a differential data which, as a detection data, replaces a corresponding original sampling data;

step C, calculating statistics of the detection data obtained at step B to screen out, according to a predetermined screening condition, valid data to calculate a DC offset component indicative of a noise ingredient; and step D, obtaining noise-filtered detection data by subtracting the DC offset component obtained at step C from each detection data obtained at step B.

In another embodiment, a noise reduction system for a touch detection device is provided. The touch detection nodes of the touch detection device are divided into one or more groups. The noise reduction system generally includes a sampling unit, a differential value calculating unit, a noise calculating unit, and a noise filtering unit. The sampling unit is used to perform a synchronous sampling on the touch detection nodes belonging to the same group and store the sampling data. The differential value calculating unit is used to compare each sampling data against a corresponding reference data to calculate a differential data to replace a corresponding original sampling data. The noise calculating unit is used to calculate statistics of the detection data obtained by the differential value calculating unit to screen out, according to a predetermined screening condition, valid data to calculate a DC offset component indicative of a noise ingredient. The noise filtering unit is used to obtain noise-filtered detection data by subtracting the DC offset component obtained by the noise calculating unit from each detection data obtained by the differential value calculating unit.

In still another embodiment, a touch terminal is provided. The touch terminal includes a touch detection device having a touch sensor unit and a touch controller unit. The touch controller unit includes the noise reduction system as described above.

In embodiments of the noise reduction methods and system, all touch detection nodes of the touch detection device are divided into several groups (for example, with each group containing one row, one column, several rows or columns of detection nodes). A synchronous sampling is performed on the touch detection nodes in each group, such that the influence of the interference signals on each group of sampling data is the same or approximately the same. By taking advantages of the characteristic that the influence of the interference signals on the sampling data for the same group has the same amplitude and direction, the noise ingredient in the sampling data can be filtered out as a direct current (DC) offset component, thus diminishing the influence of the external interference signals on the touch detection device. As one independent advantage, application of the noise reduction method and system saves the shielding layer 24 for the touch screen structure shown in FIG. 6A and FIG. 6B. Therefore, the original double-layer process is simplified to a single-layer process, thus reducing the product cost.

One or more independent aspects of the invention will become apparent by consideration of the detailed description, claims and accompanying drawings.

DETAILED DESCRIPTION

Before any independent embodiments of the invention are explained in detail, it is to be understood that the invention is not limited in its application to the details of construction and the arrangement of components set forth in the following description or illustrated in the following drawings. The invention is capable of other independent embodiments and of being practiced or of being carried out in various ways.

In the present embodiment, the touch detection nodes are divided into several groups (for example, with each group having one row, one column, several rows or several columns of detection nodes), and a synchronous sampling is performed on each group such that the sampling data for each group is subject to the same or substantially the same influence of the interference signals. By taking advantages of the characteristic that the influence of the interference signals on the sampling data for the same group has the same amplitude and direction, a noise ingredient in the sampling data can be filtered out as a direct current (DC) offset component, thus diminishing the influence of the external interference signals on the touch detection device.

Synchronous sampling must be performed in order to capture the uniform noise influence in the sampling data. However, for a touch detection system having a large number of touch detection nodes, it may not be possible to synchronously sample all the detection nodes because of the limited hardware resources or processing capability of the touch controller. In this regard, appropriate group sampling and processing may be a solution to this problem. The touch detection system should be constructed such that the spatial positions of the touch detection nodes arranged in one same group are adjacent each other. For a current popular capacitive multipoint touch detection device which adopts the "driving electrodes plus sensing electrodes" structure, each driving electrode of the touch sensor is a fundamental unit for grouping of the touch detection nodes. As such, the synchronous sampling can easily be achieved. For touch detection devices of other structures, the detection circuit needs to be configured such that it is feasible to synchronously sample the touch detection nodes arranged in one same group. If there is a small number of touch detection nodes, it is possible that there is only one group. While the present invention is applicable to the situation where at least two touch detection nodes are included, it should be understood that a relatively large quantity of the touch detection nodes contributes to a more significant noise reduction result.

Figure 7:
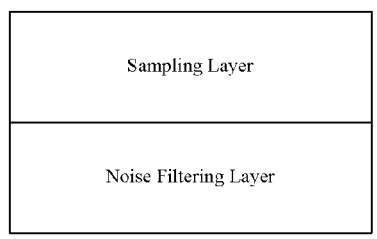
FIG. 7 illustrates a logic implementation of the noise reduction processing for a touch detection device according to one embodiment of the present invention.

Based on the principle described above, FIG. 7 illustrates an exemplary logic implementation of detection data noise reduction for a touch detection device. This logic includes two layers, i.e. a sampling layer and a noise filtering layer. The sampling layer performs parallel and synchronous sampling and operates to acquire raw sampling data of all detection channels in one same group synchronously and rectify these sampling data in light of a reference. The noise filtering layer statistically analyzes each group of sampling data and filters the noise ingredient thus obtaining noise-reduced detection data.

Figure 8A:
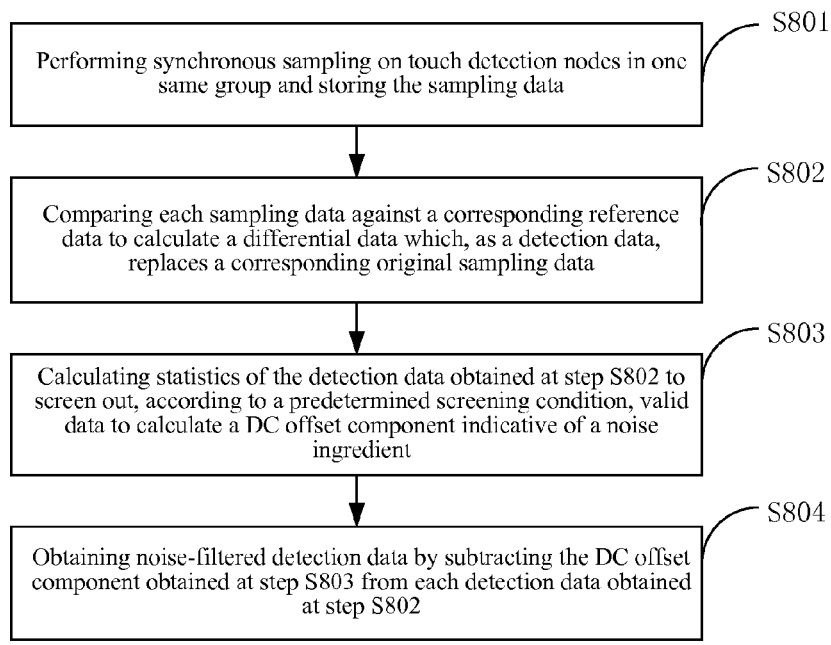
FIG. 8A is a flowchart of a noise reduction method for a touch detection device according to one embodiment of the present invention.

FIG. 8A is a flowchart of an exemplary detection data noise reduction method for a touch detection device.

At step S801, synchronous sampling is performed on the touch detection nodes in one same group and the sampling data are stored.

Figure 10:
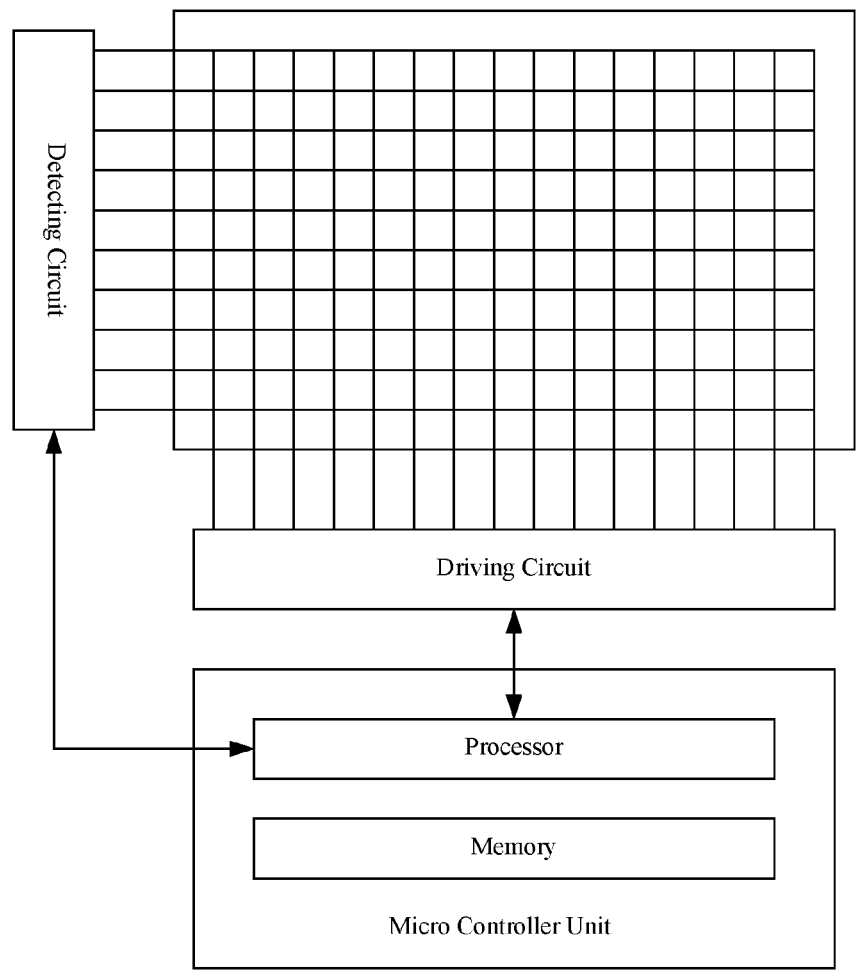
FIG. 10 illustrates a hardware structure of a touch terminal according to one embodiment of the present invention.

As described above, the influence of the interference signals on the touch detection data in the same group is the same or substantially the same. Therefore, in this embodiment, the noise component of each group to be filtered is calculated through statistics. For example, FIG. 10 illustrates a hardware structure of a touch detection device which includes a sensor having ten rows of sensing electrodes and fifteen columns of driving electrodes. As illustrated, the touch detection device has 10*15=150 touch detection nodes and therefore has 150 sampling data:

$S_{11}, S_{12}, S_{13}, \ldots, S_{114}, S_{115};$ $S_{21}, S_{22}, S_{23}, \ldots, S_{214}, S_{215};$

...

$S_{101}, S_{102}, S_{103}, \ldots, S_{1014}, S_{1015};$

In this data matrix, $S_{ij}$ represents the sampling data of the touch detection nodes in the i-th row and the j-th column For example, S214 represents the sampling data of the detection node in the second row and the fourteenth column.

The touch detection nodes are grouped according to each column of driving electrode, such that, the first sampling data group includes ten sampling data of corresponding touch detection nodes distributed on the first to tenth rows of sensing electrodes and synchronously driven by the first column of driving electrode, i.e. $S_{11}, S_{21}, \ldots, S_{101}$; the second sampling data group includes ten sampling data of corresponding touch detection nodes distributed on the first to tenth rows of sensing electrodes and synchronously driven by the second column of driving electrode, i.e. $S_{12}, S_{22}, \ldots, S_{102}$; as can be deduced by analogy, the fifteenth sampling data group includes ten sampling data of corresponding touch detection nodes distributed on the first to tenth rows of sensing electrodes and synchronously driven by the fifteenth column of driving electrode, i.e. $S_{115}, S_{215}, \ldots, S_{1015}$.

It should be understood that the arrangement of the driving electrodes and the sensing electrodes may vary, especially in the aspect of spatial positions, with the change in sensor layout or pin connection manner of the touch controller. As a result, the sampling data matrix may be grouped in different patterns in practice. However, no matter how the arrangement of the electrodes varies, the principle is that touch detection nodes that are synchronously sampled are assigned to the same group, for facilitating separation and filtration of the noise ingredient from the sampling data.

At step S802, each sampling data is compared against a corresponding reference data to calculate a differential data. This differential data is used as a detection data to replace a corresponding raw sampling data.

At this step, a subtraction is simply performed as follows:

$D_{ij}=S_{ij}-R_{ij}$

In this subtraction, $R_{ij}$ is a reference data corresponding to the sampling data $S_{ij}$, and the differential data $D_{ij}$ is the calculation result to replace $S_{ij}$ to thereby obtain a sampling data rectified with respect to a reference data, i.e. a detection data for further processing. In practice, the reference data of the touch detection device is a sampling data under static background of no-touch and no-interference condition. The reference data is a fixed systematic error with respect to an actual detection value of a detection node, which needs to be subtracted from a sampling data to obtain a useful detection data.

At step S803, statistics of the sampling data obtained through replacement at step S802 is calculated to screen out valid data from the sampling data according to a predetermined screening condition. These valid data are used to calculate a DC offset component indicative of the noise ingredient.

This step is a key step in the illustrated embodiment. The differential data obtained at step S802, i.e. the detection data, contains the touch information ingredient caused by a touch or approach event as well as the noise ingredient caused by interferences. To the group of sampling data obtained by synchronous sampling at step S801, this noise ingredient is a DC offset such that the detection data are shifted upward or downward. The shift amplitude varies with the change in noise level but is fixed and systematic in one sampling. Obtaining of the DC offset will be explained in detail in specific embodiments hereinafter.

At step S804, noise-filtered detection data are obtained by subtracting the DC offset component obtained at step S803 from each detection data calculated at step S802.

After performing steps S801, S802, S803 and S804 to each group of detection nodes within each detection period of the touch detection device, it follows that the noise is removed to a large extent from the detection data used in later processing and control by the touch detection device, thus enabling the touch detection device to stably operate in an interference environment.

Step S803 is further described below in conjunction with several embodiments.

Considering the problem to be solved by the present invention, the DC offset component associated with one data group may be calculated using several methods. A simplest one is to calculate the average of this group of detection data. However, the detection data may include the local touch information ingredient in addition to the systematic noise ingredient, step S80332, calculating the distribution statistics of a group of detection data obtained at step S802;

step S80333, identifying a most concentrated data distribution scale and a second most concentrated data distribution scale;

step S80334, determining whether the amplitude of an average of the data in the most concentrated data distribution scale is greater than the threshold value;

step S80335, if the determination result of step S80334 is yes, then further determining whether the amplitude of an average of the data in the second most concentrated data distribution scale is less than the amplitude of average of the data in the most concentrated data distribution scale;

step S80336, if the determination result of step S80335 is yes, then storing the average of the data in the second most concentrated data distribution scale; or S80337, if either of the determination results of step S80334 and step S80335 is no, then storing the average of the data in the most concentrated data distribution scale.

The average obtained at step S80336 or step S80337 is the desired DC offset component.

The above method steps are explained below taking the example of a group of practical sampling data for ease of understanding. For example, Table 1 below shows a matrix of 150 detection data arranged in 15 groups, with each group containing 10 detection data corresponding to 10 touch detection nodes. Each detection data is obtained by performing a subtraction between a raw sampling data obtained under an interference environment and a corresponding reference value. FIG. 8C is its corresponding 3D meshed diagram illustrating the detection data prior to noise-reduction.

TABLE 1

| Group 1 | Group 2 | Group 3 | Group 4 | Group 5 | Group 6 | Group 7 | Group 8 | Group 9 | Group 10 | Group 11 | Group 12 | Group 13 | Group 14 | Group 15 |
| --- | --- | --- | --- | --- | --- | --- | --- | --- | --- | --- | --- | --- | --- | --- |
| −11 | 64 | −10 | −65 | −46 | 0 | 53 | 55 | 6 | −51 | 10 | −63 | −35 | −12 | 36 |
| −13 | 60 | −9 | −63 | −61 | −23 | 54 | 52 | 6 | −50 | 12 | −75 | −48 | −9 | 37 |
| −11 | 59 | −8 | −64 | −85 | −35 | 55 | 53 | 5 | −48 | 11 | −32 | −85 | −10 | 36 |
| −11 | 59 | −10 | −62 | −140 | −62 | 53 | 55 | 5 | −51 | 12 | −71 | −80 | −4 | 37 |
| −13 | 61 | −8 | −63 | −96 | −51 | 59 | 55 | 5 | −51 | 10 | −83 | −85 | −8 | 38 |
| −16 | 61 | −10 | −64 | 203 | 47 | 57 | 49 | 2 | −50 | 11 | 60 | 120 | −7 | 38 |
| −10 | 61 | −8 | −62 | 268 | 123 | 52 | 51 | 3 | −44 | 13 | 161 | 280 | −6 | 34 |
| −12 | 61 | −9 | −62 | −32 | 0 | 57 | 52 | 5 | −46 | 13 | −61 | 0 | −8 | 35 |
| −12 | 59 | −8 | −58 | −61 | 0 | 51 | 51 | 6 | −46 | 12 | −41 | −74 | −8 | 35 |
| −12 | 56 | −9 | −60 | −57 | 0 | 55 | 48 | 7 | −50 | 12 | −55 | −93 | −5 | 35 | and simply calculating the average as the noise ingredient is only reasonable for those data groups without the touch information ingredient. The touch information ingredient data involving in the average calculation adversely affects the separation of systematic noise ingredient. In order to effectively separate the noise ingredient, it is necessary to exclude the data having touch information ingredient from the calculation of the DC offset component. More specifically, it is necessary to perform a statistical calculation such that, in principle, only valid data (i.e., those data containing as less touch information ingredient as possible) are chosen for calculation of the DC offset component. Several exemplary embodiments are given below to explain the calculation of the DC offset component.

Figure 8B:
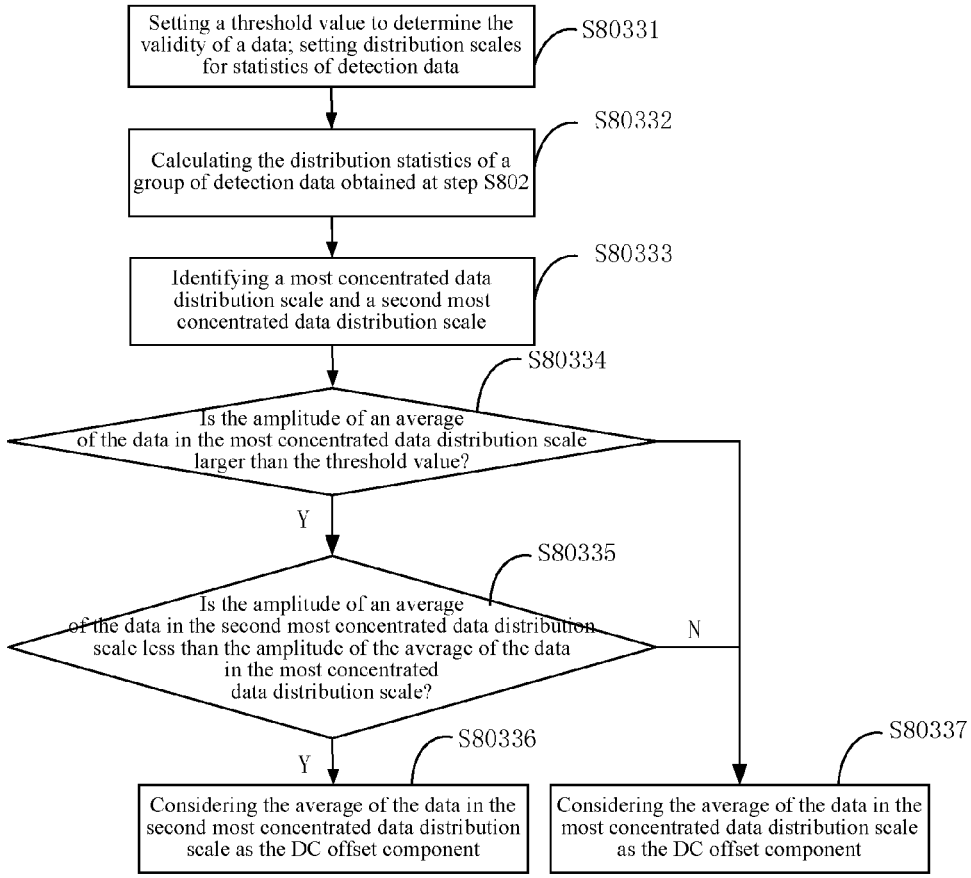
FIG. 8B is a flowchart of filtering noise from detection data according to one embodiment of the present invention.
Figure 8C:
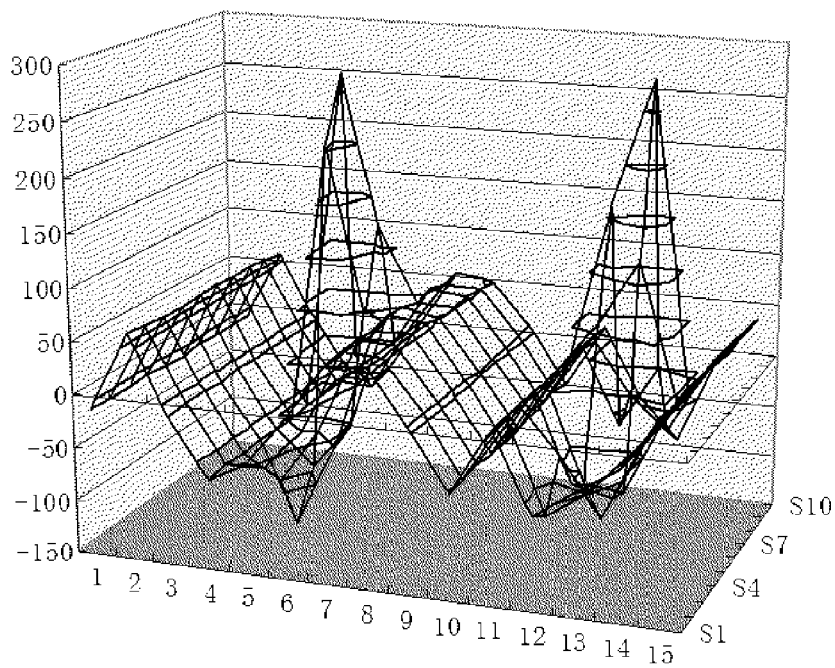
FIG. 8C is a 3D meshed diagram illustrating the detection data prior to noise reduction according to one embodiment of the present invention.

In a typical embodiment shown in FIG. 8B, step S803 may include the following sub-steps:

step S80331, setting a threshold value to determine the validity of a data; and setting distribution scales for statistics of detection data;

In this example, the detection data have a dynamic range of −512 to +511, and, a value 200 is chosen for the threshold value as a rule of thumb (i.e., it is assumed that a detection data greater than 200 is resulted by a touch event). Distribution scales are then set according to Table 2, which has sixteen scales covering the values from −512 to +511.

TABLE 2

| Scale | Data Range |
| --- | --- |
| −8 | −449~−512 |
| −7 | −385~−448 |
| −6 | −321~−384 |
| −5 | −257~−320 |
| −4 | −193~−256 |
| −3 | −129~−192 |
| −2 | −65~−128 |
| −1 | −1~−64 |

TABLE 2-continued

| Scale | Data Range |
| --- | --- |
| 0 | 0~63 |
| 1 | 64~127 |
| 2 | 128~191 |
| 3 | 192~255 |
| 4 | 256~319 |
| 5 | 320~383 |
| 6 | 384~447 |
| 7 | 448~511 |

Figure 1:
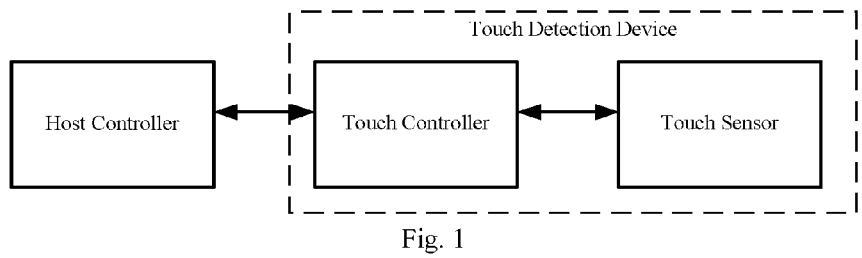
FIG. 1 illustrates a typical application of a touch detection device.
Figure 2:
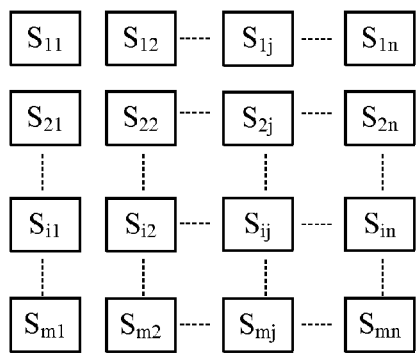
FIG. 2 illustrates a matrix of touch detection sampling data.
Figure 3:
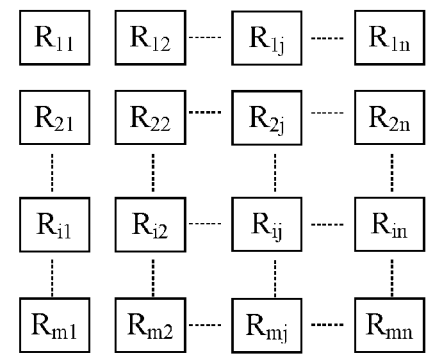
FIG. 3 illustrates a matrix of touch detection reference data.
Figure 4A:
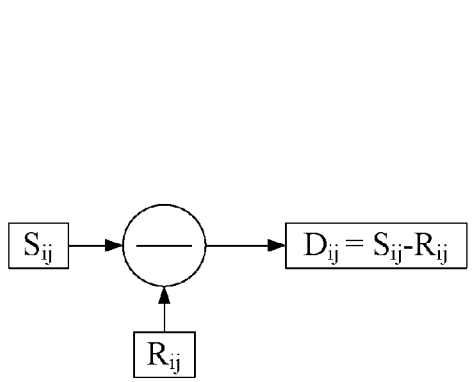
FIG. 4A illustrates the calculation of differential value based on the detection sampling data of FIG. 2 and the reference data of FIG. 3.
Figure 4B:
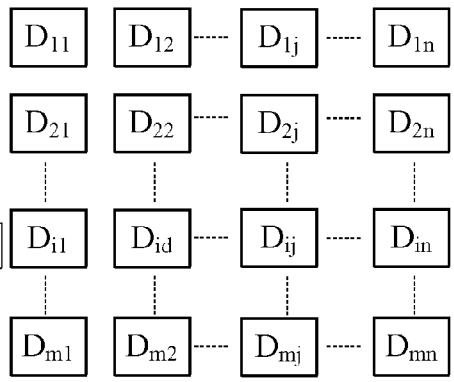
FIG. 4B illustrates a matrix of the touch detection differential values calculated according to FIG. 4A.
Figure 5:
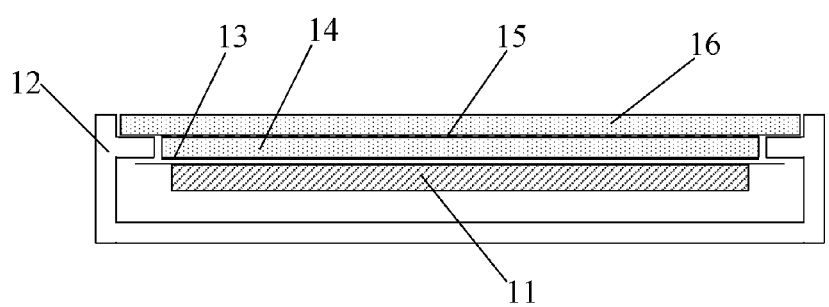
FIG. 5 illustrates a conventional touch terminal in which the driving electrode layer and the sensing electrode layer are not located in the same layer.
Figure 6A:
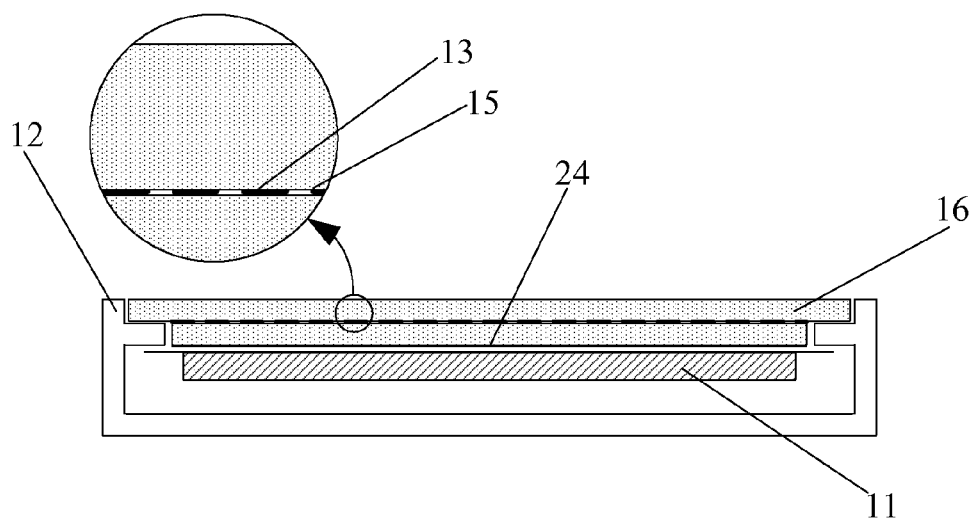
FIG. 6A illustrates another conventional touch terminal in which the driving electrodes and the sensing electrodes are located in the same layer.
Figure 6B:
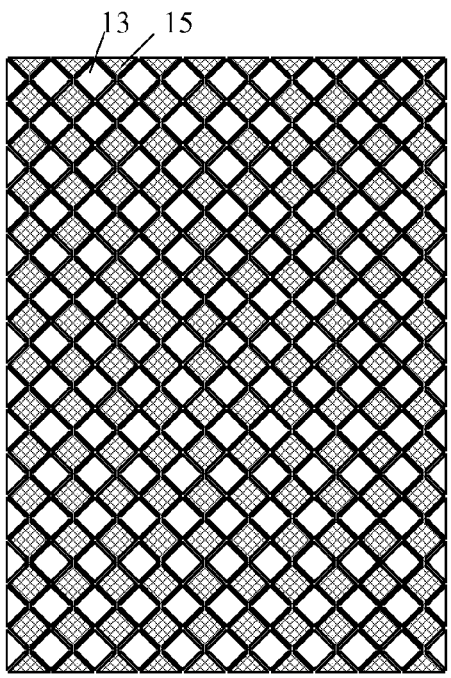
FIG. 6B illustrates the shape of the driving electrode and the sensing electrode of FIG. 6A.

Step S80331 is thus accomplished. Later, at Step S80332, the distribution statistics of the detection data obtained at Step S802 over these scales is calculated. Exemplary calculation of the distribution statistics is described below with respect to the first and fifth groups of detection data in FIG. 1.

Figure 8D:
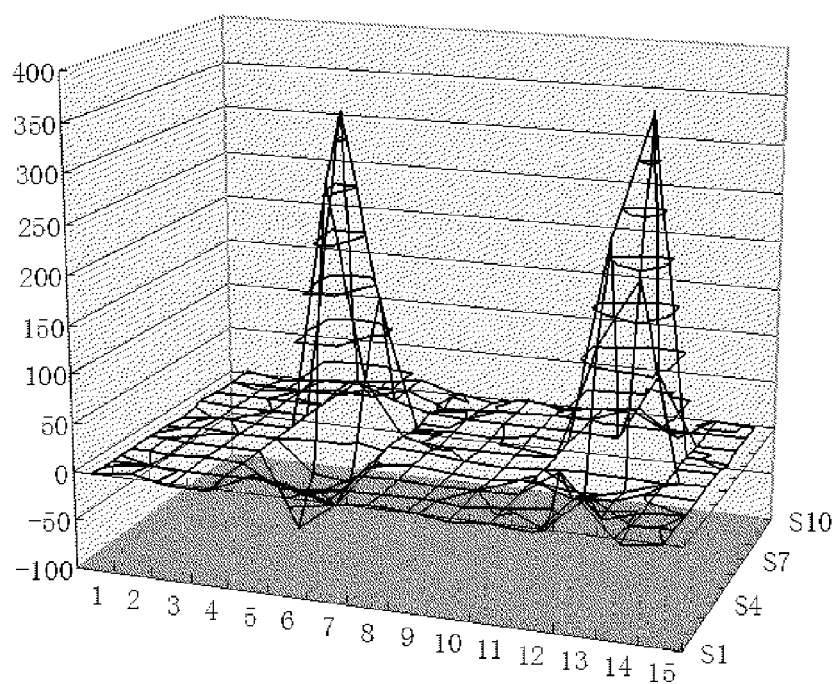
FIG. 8D is a 3D meshed diagram illustrating the detection data after the noise is reduced according to one embodiment of the present invention.
Figure 8E:
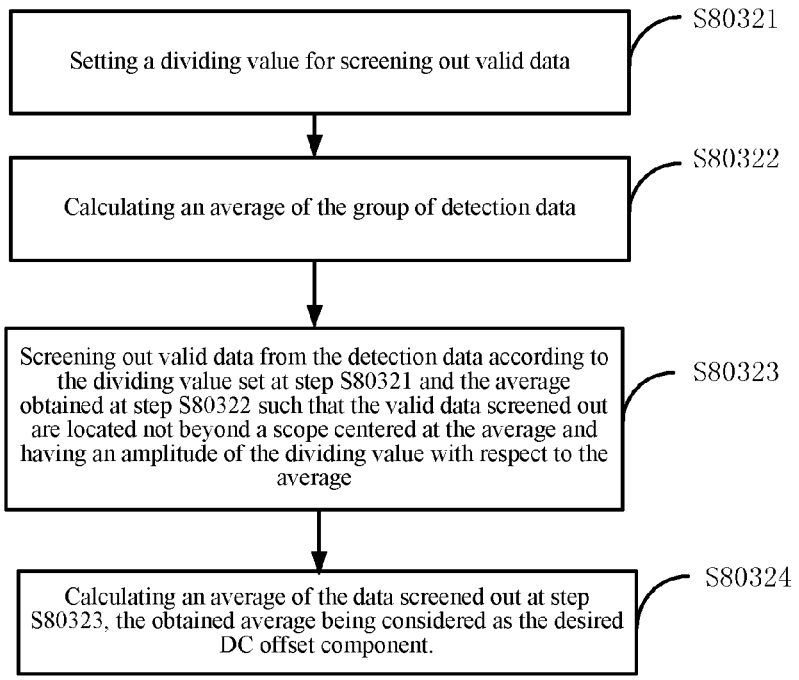
FIG. 8E is a flowchart of calculating a DC offset which is suitable for a single-point touch application according to one embodiment of the present invention
Figure 8F:
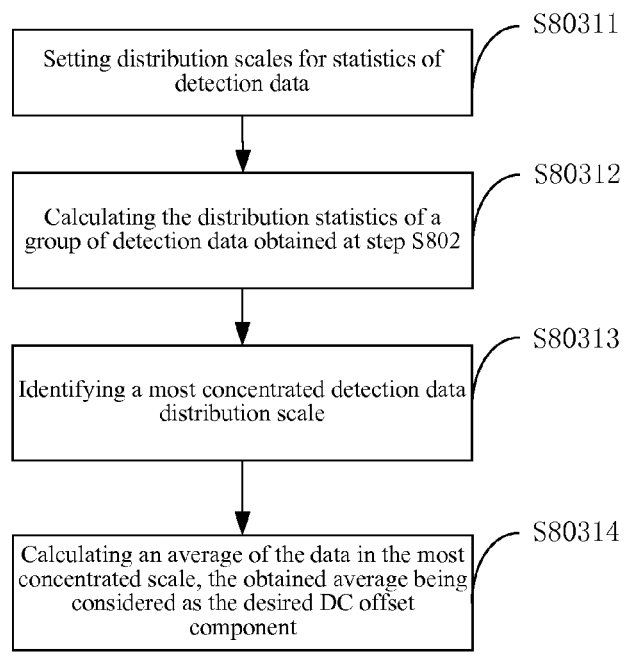
FIG. 8F is a flowchart of calculating a DC offset which is suitable for an application where there are a small number of touch points.

Table 3 lists the statistics result of the first and fifth groups of detection data of Table 1 according to the preset distribution scales of Table 2. As shown, the ten detection data of the first group all fall within the scale represented by "−1". FIG. 8H is a more intuitive histogram illustrating the statistics result of the first group of detection data. The scale "−1" is the most concentrated distribution scale of the detection data as well as the second most concentrated distribution scale, and the average of all data within this scale is less than the thresh-

TABLE 3

| Detection Data Of Group 1 | Scales (−8~+7) | Detection Data Of Group 5 | Scales (−8~+7) |
| --- | --- | --- | --- |
| −11 | −1 | −46 | −1 |
| −13 | −1 | −61 | −1 |
| −11 | −1 | −85 | −2 |
| −11 | −1 | −140 | −3 |
| −13 | −1 | −96 | −2 |
| −16 | −1 | 203 | 3 |
| −10 | −1 | 268 | 4 |
| −12 | −1 | −32 | −1 |
| −12 | −1 | −61 | −1 |
| −12 | −1 | −57 | −1 |

Calculating averages of the detect data of the concentrated scales for the first to fifth groups results in values −12, 60, −8, −62, −62, −13, 54, 52, 5, −48, 11, −60, −71, −7, 36. These averages represent the DC offset components introduced into various groups of detection data due to interferences, which cause the detection data to deviate more or less from reference data due to interferences rather than to touch events. The DC offset components are subtracted from corresponding groups of detection data thus obtaining the noise-reduced detection data listed in Table 4 (FIG. 8D is its corresponding 3D meshed diagram illustrating the detection data after noise reduction.).

TABLE 4

| Group 1 | Group 2 | Group 3 | Group 4 | Group 5 | Group 6 | Group 7 | Group 8 | Group 9 | Group 10 | Group 11 | Group 12 | Group 13 | Group 14 | Group 15 |
| --- | --- | --- | --- | --- | --- | --- | --- | --- | --- | --- | --- | --- | --- | --- |
| 1 | 4 | −2 | −3 | 16 | 13 | −1 | 3 | 1 | −3 | −1 | −3 | 36 | −5 | 0 |
| −1 | 0 | −1 | −1 | 1 | −10 | 0 | 0 | 1 | −2 | 1 | −15 | 23 | −2 | 1 |
| 1 | −1 | 0 | −2 | −23 | −22 | 1 | 1 | 0 | 0 | 0 | 28 | −14 | −3 | 0 |
| 1 | −1 | −2 | 0 | −78 | −49 | −1 | 3 | 0 | −3 | 1 | −11 | −9 | 3 | 1 |
| −1 | 1 | 0 | −1 | −34 | −38 | 5 | 3 | 0 | −3 | −1 | −23 | −14 | −1 | 2 |
| −4 | 1 | −2 | −2 | 265 | 60 | 3 | −3 | −3 | −2 | 0 | 120 | 191 | 0 | 2 |
| 2 | 1 | 0 | 0 | 330 | 136 | −2 | −1 | −2 | 4 | 2 | 221 | 351 | 1 | −2 |
| 0 | 1 | −1 | 0 | 30 | 13 | 3 | 0 | 0 | 2 | 2 | −1 | 71 | −1 | −1 |
| 0 | −1 | 0 | 4 | 1 | 13 | −3 | −1 | 1 | 2 | 1 | 19 | −3 | −1 | −1 |
| 0 | −4 | −1 | 2 | 5 | 13 | 1 | −4 | 2 | −2 | 1 | 5 | −22 | 2 | 0 | old value. Therefore, statistics of the first group of detection data is calculated according to the following steps:

S80332->S80333->S80334->S80337

As a result, the value of the DC offset component of the first group detection data is −12.

Figure 8G:
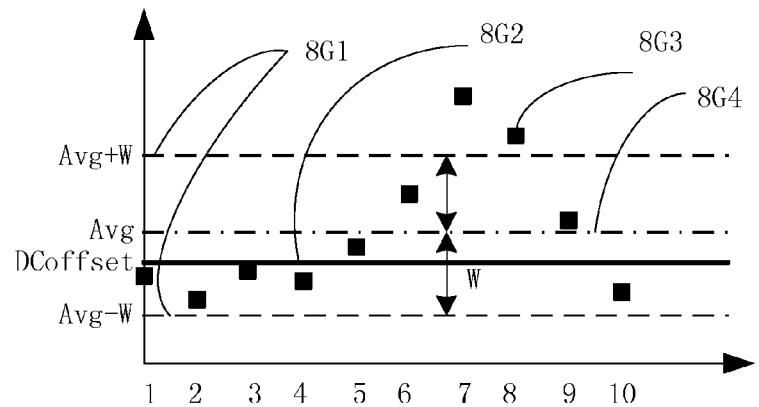
FIG. 8G is an intuitive diagram illustrating a simplified embodiment of screening valid data.
Figure 8H:
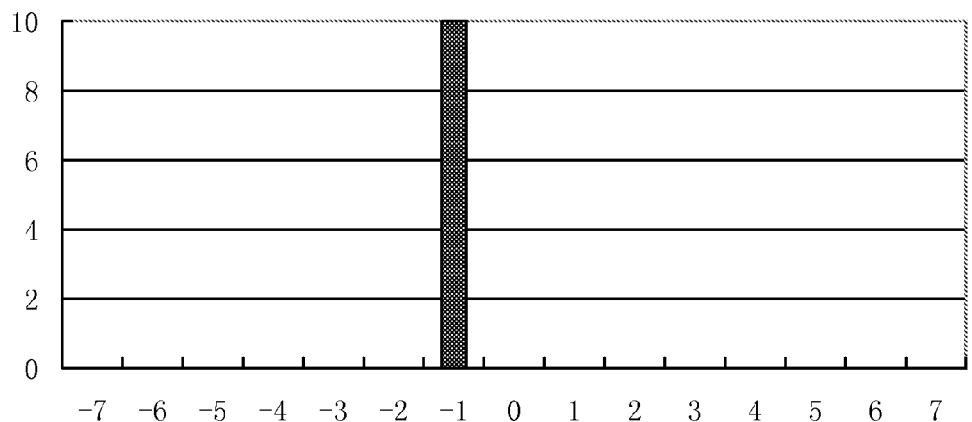
FIG. 8H is a histogram illustrating distribution statistics of the first group of data according to one embodiment of the present invention.
Figure 8I:
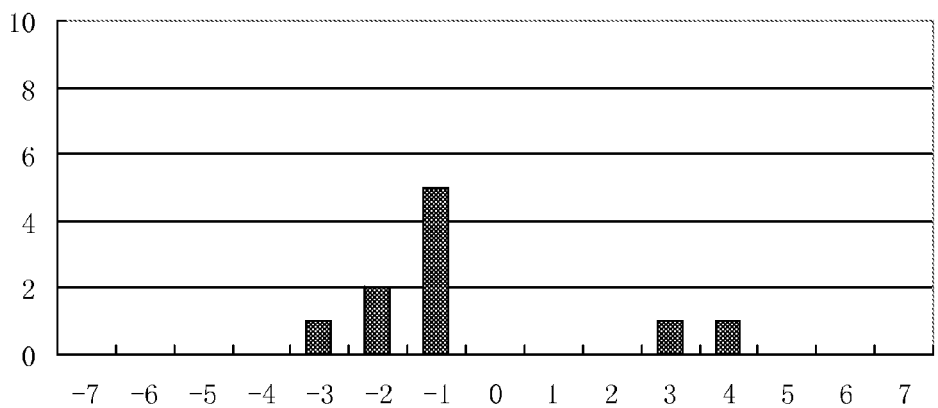
FIG. 8I is a histogram illustrating distribution statistics of the fifth group of data according to one embodiment of the present invention.

FIG. 8I is a histogram illustrating distribution of the fifth group of detection data of Table 3 over the preset scales. As shown, the most concentrated distribution scale of the detection data is the scale "−1", and the second most concentrated distribution scale of the detection data is the scale "−2". Since the average of the detection data within the most concentrated scale is less than the threshold, statistics of the fifth group of detection data is calculated according to the following steps:

S80332->S80333->S80334->S80337

As a result, the value of the DC offset component of the fifth group of detection data is −62.

Obviously, the fifth group of detection data contains substantial touch information ingredient. It is the aforementioned steps of processing that guarantee an adequate separation of the noise component.

It can be reasonably concluded, from either the data of Table 4 or the intuitive 3D diagram of FIG. 8D, that the detection data having undergone the noise reduction processing more clearly reflect the touch information ingredient. After the noise reduction processing of the detection data is performed, the amplitude of the original fluctuating background noise ingredient is significantly depressed. This guarantees accurate and stable touch detection results for later processing.

For applications where there are a small number of touch points, a simplified and practical method can be used to reduce calculation amount and increase the processing speed. As an alternative implementation of step S803, another simplified flowchart of calculating the DC offset is shown in FIG. 8E and illustrated in FIG. 8G. This simplified calculation is adapted for detecting a small number of touch points, for example, a single or double-point touch situation. This embodiment includes the following steps:

step S80321, setting a dividing value W for screening out valid data;

step S80322, calculating an average Avg 8G4 of the group of detection data obtained at step S802;

step S80323, screening out valid data from the detection data according to the dividing value W set at step S80321 and the average Avg 8G4 obtained at step S80322 such that the detection data screened out are located not beyond a scope 8G1 centered at the average Avg 8G4 and having an amplitude of the dividing value W with respect to the average Avg 8G4, i.e. identifying those detection data falling within the interval between Avg-W and Avg+W as the valid data for calculating the DC offset, wherein, as a result, the data corresponding to the positions "7" and "8" that obviously contain touch information ingredient are excluded from the data for calculating the DC offset; and step S80324, calculating an average of the data screened out at step S80323 to thereby obtain the desired DC offset component 8G2 (DCoffset).

As can be seen from FIG. 8G, the finally obtained valid data average DCoffset is closer to the actual DC offset than is the aforementioned average Avg. In this embodiment, the dividing value W can be set as 1/16 of the dynamic range of the detection data. However, in a different application, the dividing value W may vary according to the data dynamic range of the touch detection device so as to obtain a stable result.

As another simplified alternative embodiment, FIG. 8F illustrates another flowchart of calculating the DC offset that is simplified relative to that of FIG. 8B, which is adapted for detecting a small number of touch points (e.g. single or double-point touch). This embodiment includes:

step S80311, setting distribution scales for statistics of detection data;

step S80312, calculating the distribution statistics of a group of detection data obtained at Step S802;

step S80313, identifying a most concentrated detection data distribution scale; and step S80314, calculating an average of the data in the most concentrated scale.

The obtained average is thus the desired DC offset component.

It should be understood that all or part of the steps of the methods discussed in the above embodiments may be implemented by computer program in combination with associated hardware. The program may be stored on a computer-readable medium such as ROM/RAM, a magnetic disc or an optical disc.

Figure 9:
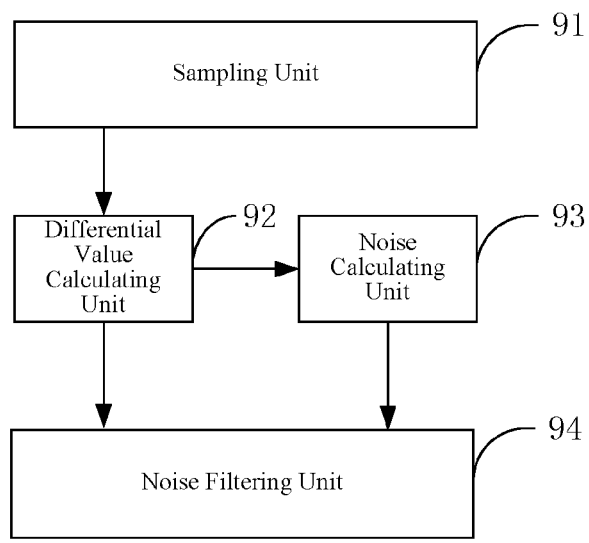
FIG. 9 is a block diagram of a detection data noise reduction system for a touch detection device according to one embodiment of the present invention.

FIG. 9 is a block diagram of a detection data noise reduction system for a touch detection device according to one embodiment of the present invention. For ease of description, only those related to this embodiment are illustrated in FIG. 9. This system may be integrated into a touch terminal shown in FIG. 10. The touch terminal includes a touch detection device having a touch sensor unit and a touch controller unit couple to the touch sensor unit. The system of FIG. 9 may be embedded into touch controller unit, and the touch controller unit may be implemented by an application specific integrated circuit (ASIC) or a digital signal processor (DSP).

Referring to FIG. 9, the detection data noise reduction system include a sampling unit 91, a differential value calculating unit 92, a noise calculating unit 93, and a noise filtering unit 94. The sampling unit 91 performs a synchronous sampling on the touch detection nodes belonging to the same group and stores the sampling data. The differential value calculating unit 92 calculates a differential value by comparing each sampling data obtained by the sampling unit 91 against a corresponding reference data and the differential value is used as a detection data to replace a corresponding raw sampling data. The noise calculating unit 93 then calculates statistics of the replacing detection data obtained by the differential value calculating unit 92 to screen out, in accordance with a preset screening condition, valid data to calculate a DC offset component indicative of a noise ingredient. Finally, the noise filtering unit 94 subtracts the DC offset component obtained by the noise calculating unit 93 from the detection data calculated by the differential value calculating unit 92, thus obtaining noise-filtered detection data.

Figure 11:
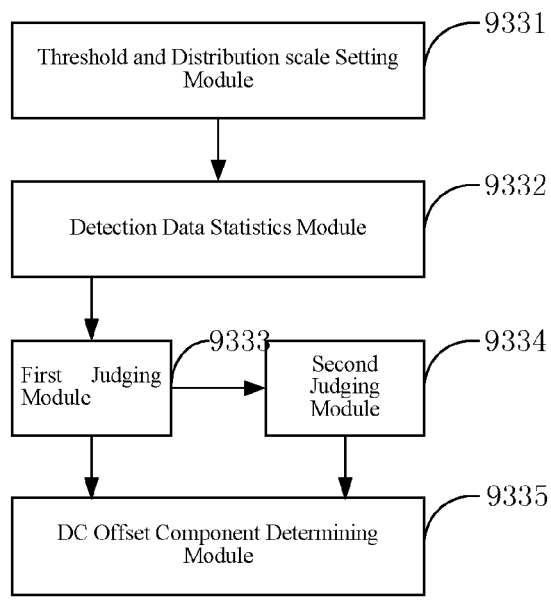
FIG. 11 is a block diagram of the noise calculating unit according to a first embodiment of the present invention.

FIG. 11 is a block diagram of a noise calculating unit 93 according to a first embodiment of the present invention. As shown, the noise calculating unit 93 includes a threshold and distribution scale setting module 9331, a detection data statistics module 9332, a first judging module 9333, a second judging module 9334, and a DC offset component determining module 9335. The threshold and distribution scale setting module 9331 is used to set a threshold value for determining the validity of a data and distribution scales for statistics of detection data. The detection data statistics module 9332 is used to calculate the distribution statistics of a group of replacing detection data obtained by the differential value calculating unit 92. The first judging module 9333 is used to judge whether the amplitude of an average of the detection data in a most concentrated scale is greater than the threshold value. If the result of the judgment made by the first judging module 9333 is yes, the second judging module 9334 is used to further judge whether the amplitude of an average of the detection data in a second most concentrated scale is less than the amplitude of the average of the detection data in the most concentrated scale. The DC offset component determining module 9335 considers the average of the detection data in the second most concentrated scale as the DC offset component if the result of the judgment made by the second judging module 9334 is yes, or considers the average of the detection data in the most concentrated scale as the DC offset component if the result of the judgment made by the first judging module 9333 or by the second judging module 9334 is no.

Figure 12:
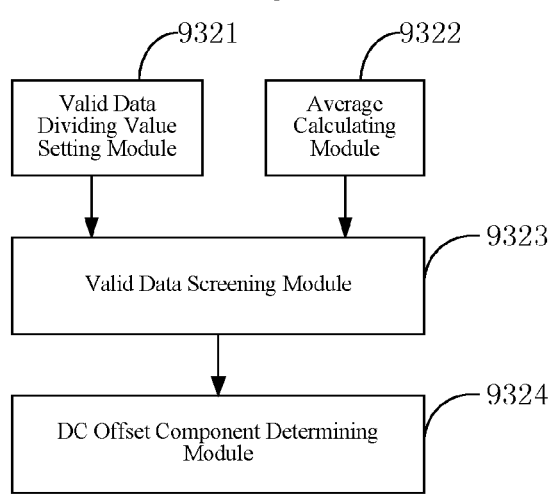
FIG. 12 is a block diagram of the noise calculating unit according to a second embodiment of the present invention.

FIG. 12 is a block diagram of a noise calculating unit 93 according to a second embodiment of the present invention. The noise calculating unit 93 includes a valid data dividing value setting module 9321, an average calculating module 9322, a valid data screening module 9323, and a DC offset determining module 9324. The valid data dividing value setting module 9321 is used to set a dividing value for screening valid data. The average calculating module 9323 is used to calculate an overall average of the group of detection data. The valid data screening module 9323 is used to screen out valid data from the detection data according to the dividing value set by the valid data dividing value setting module and the average obtained by the average calculating module 9322, such that the detection data screened out are located not beyond a scope centered at the average and having an amplitude of the dividing value with respect to the average. The DC offset component determining module 934 calculates an average of the detection data screened out by the valid data screening module 9323 and this average is considered as the desired DC offset component.

Figure 13:
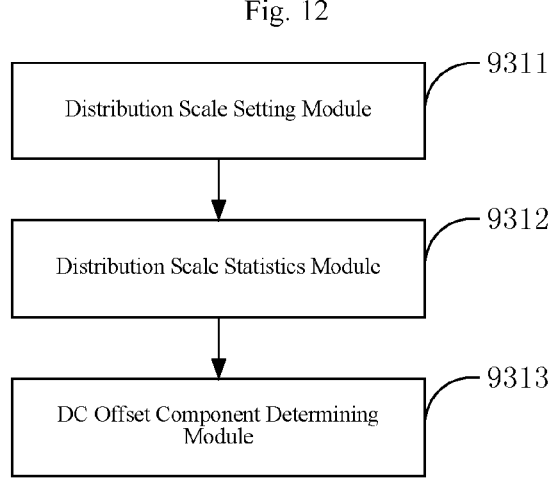
FIG. 13 is a block diagram of the noise calculating unit according to a third embodiment of the present invention.

FIG. 13 is a block diagram of a noise calculating unit 93 according to a third embodiment of the present invention. The noise calculating unit 93 of the third embodiment includes a distribution scale setting module 9311, a distribution scale statistics module 9312 and a DC offset component determining module 9313. The distribution scale setting module 9311 is used to set distribution scales for statistics of detection data. The distribution scale statistics module 9312 calculates distribution statistics of the group of replacing detection data obtained by the differential value calculating unit. The DC offset component determining module 9313 calculates an average of the detection data in a most concentrated scale obtained by the distribution scale statistics module 9312 and this average is considered as the desired DC offset component.

In another embodiment, a touch terminal is provided which includes a touch detection device. The touch detection device includes a touch sensor unit and a touch controller unit coupled to the touch sensor unit. The touch controller unit includes a touch detection data noise reduction system as described in the foregoing embodiments.

This system is configured and operates in the same way as discussed in the foregoing embodiments and, therefore, explanation thereof is not repeated herein. This embodiment is suitable for various types of touch detection devices.

While there has been described in the foregoing description preferred embodiments of the present invention, it will be understood by those skilled in the art that many variations or modifications in details of design or construction may be made without departing from the scope of the present invention.

What is claimed is:

1. A noise reduction method for a touch detection device, wherein touch detection nodes of the touch detection device are divided into one or more groups and the noise reduction method comprises:
   step A, performing a synchronous sampling on the touch detection nodes in one same group and storing the sampling data;
   step B, comparing each sampling data against a corresponding reference data to calculate a differential data which, as a detection data, replaces a corresponding original sampling data;
   step C, calculating statistics of the replacing detection data obtained at step B to screen out, according to a predetermined screening condition, valid data to calculate a DC offset component indicative of a noise ingredient; and
   step D, obtaining noise-filtered detection data by subtracting the DC offset component obtained at step C from each detection data obtained at step B;
   wherein step C further comprises:
   step C21, setting a threshold value to determine the validity of a data; and setting distribution scales for statistics of detection data distribution;
   step C22, calculating the distribution statistics of a group of detection data obtained at step B;
   step C23, identifying a most concentrated data distribution scale and a second most concentrated data distribution scale;
   step C24, determining whether the amplitude of an average of the data in the most concentrated data distribution scale is larger than the threshold value;
   step C25, if the determination result of step C24 is yes, further determining whether the amplitude of an average of the data in the second most concentrated data distribution scale is less than the amplitude of the average of the data in the most concentrated data distribution scale;
   step C26, if the determination result of step C25 is yes, considering the average of the data in the second most concentrated data distribution scale as the DC offset component; and
   step C27, if either the determination result of step C24 or the determination result of step C25 is no, considering the average of the data in the most concentrated data distribution scale as the DC offset component.

2. A noise reduction system for a touch detection device, touch detection nodes of the touch detection device being divided into one or more groups, the noise reduction system comprising:
   a sampling unit configured to perform a synchronous sampling on the touch detection nodes belonging to the same group and store the sampling data;
   a differential value calculating unit configured to compare each sampling data against a corresponding reference data to calculate a differential data to replace a corresponding original sampling data;
   a noise calculating unit configured to calculate statistics of the replacing detection data obtained by the differential value calculating unit to screen out, according to a predetermined screening condition, valid data to calculate a DC offset component indicative of a noise ingredient; and
   a noise filtering unit configured to obtain noise-filtered detection data by subtracting the DC offset component obtained by the noise calculating unit from each detection data calculated by the differential value calculating unit;
   wherein the noise calculating unit comprises:
   a threshold and distribution scale setting module configured to set a threshold value for determining the validity of a data and distribution scales for statistics of detection data distribution;
   a detection data statistics module configured to calculate the distribution statistics of a group of replacing detection data obtained by the differential value calculating unit;
   a first judging module configured to judge whether the amplitude of an average of detection data in a most concentrated data distribution scale is greater than the threshold value;
   a second judging module configured to further judge whether the amplitude of an average of detection data in a second most concentrated data distribution scale is less than the amplitude of the average of the detection data in the most concentrated scale if the result of the judgment made by the first judging module is yes; and
   a DC offset component determining module configured to consider the average of the detection data in the second most concentrated scale as the DC offset component if the result of the judgment made by the second judging module is yes, or consider the average of the detection data in the most concentrated scale as the DC offset component if the result of the judgment made by the first judging module or by the second judging module is no.

3. A touch terminal comprising a touch detection device, the touch detection device comprising:
   a touch sensor unit; and
   a touch controller unit coupled to the touch sensor unit, wherein the touch controller unit comprises a noise reduction system, touch detection nodes of the touch detection device being divided into one or more groups, the noise reduction system comprising:
   a sampling unit configured to perform a synchronous sampling on the touch detection nodes belonging to the same group and store the sampling data;
   a differential value calculating unit configured to compare each sampling data against a corresponding reference data to calculate a differential data to replace a corresponding original sampling data;
   a noise calculating unit configured to calculate statistics of the replacing detection data obtained by the differential value calculating unit to screen out, according to a predetermined screening condition, valid data to calculate a DC offset component indicative of a noise ingredient; and
   a noise filtering unit configured to obtain noise-filtered detection data by subtracting the DC offset component obtained by the noise calculating unit from each detection data calculated by the differential value calculating unit;
   wherein the noise calculating unit comprises:

a threshold and distribution scale setting module configured to set a threshold value for determining the validity of a data and distribution scales for statistics of detection data;

a detection data statistics module configured to calculate the distribution statistics of a group of replacing detection data obtained by the differential value calculating unit;

a first judging module configured to judge whether the amplitude of an average of detection data in a most concentrated data distribution scale is greater than the threshold value;

a second judging module configured to further judge whether the amplitude of an average of detection data in a second most concentrated data distribution scale is less than the amplitude of the average of the detection data in the most concentrated scale if the result of the judgment made by the first judging module is yes; and a DC offset component determining module configured to consider the average of the detection data in the second most concentrated scale as the DC offset component if the result of the judgment made by the second judging module is yes, or consider the average of the detection data in the most concentrated scale as the DC offset component if the result of the judgment made by the first judging module or by the second judging module is no.

* * * * *